United States Patent
Hecht et al.

(10) Patent No.: US 8,302,122 B1
(45) Date of Patent: Oct. 30, 2012

(54) VERIFYING CONTENT DISTRIBUTION AUTHORITY

(75) Inventors: Greg Hecht, Mountain View, CA (US); Iain Merrick, London (GB); David D. Redell, Redwood City, CA (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 12/719,306

(22) Filed: Mar. 8, 2010

(51) Int. Cl.
- H04H 60/33 (2008.01)
- H04H 20/14 (2008.01)
- H04H 60/29 (2008.01)
- H04N 7/16 (2011.01)
- H04N 7/10 (2006.01)
- H04N 7/025 (2006.01)
- G06Q 30/00 (2012.01)

(52) U.S. Cl. ............... 725/22; 725/9; 725/32; 705/14.4; 705/14.41; 705/14.44; 705/14.45; 705/14.47

(58) Field of Classification Search ........................ 725/22
See application file for complete search history.

(56) References Cited

U.S. PATENT DOCUMENTS

| 2006/0023124 A1* | 2/2006 | Mellier et al. | 348/725 |
| 2007/0143777 A1* | 6/2007 | Wang | 725/18 |
| 2007/0169146 A1* | 7/2007 | Steelberg et al. | 725/35 |
| 2010/0082404 A1* | 4/2010 | Brower et al. | 705/10 |

* cited by examiner

*Primary Examiner* — Justin Shepard
(74) *Attorney, Agent, or Firm* — Dickinson Wright PLLC

(57) ABSTRACT

Methods, systems, and apparatus, including computer programs encoded on a computer storage medium, for verifying content distribution authority. In one aspect, a method includes receiving a request for broadcast content for a broadcast feed from a requestor. In response to the request, specifying verification content for inclusion in the broadcast feed, the verification content being scheduled for presentation at a specified time. The broadcast feed is monitored for presentation of the verification content at the specified time. In turn, a determination is made whether the verification content was presented by the broadcast feed at the specified time. In response to determining that the verification content was presented by the broadcast feed at the specified time, the requestor is verified as an entity having content distribution authority over the broadcast feed.

17 Claims, 5 Drawing Sheets

VERIFYING CONTENT DISTRIBUTION AUTHORITY

BACKGROUND

This specification relates to verifying authority to control content distribution.

Broadcasters provide broadcast feeds that include data that cause presentation of audio and video content on a video device. For example, terrestrial broadcasters provide terrestrial broadcast signals that cause presentation of audio/video programming on a television set, or another device that can decode the terrestrial broadcast signals.

Broadcasters monetize their broadcast feeds by including sponsored content in the broadcast feeds. For example, broadcasters may define 15, 30, or 60 second advertisement slots in which advertising content is provided. In turn, a sponsor of the advertising content pays the broadcaster a fee for inclusion of the advertising content in the broadcast feed.

Broadcasters can employ a sales team to sell the advertisement slots directly to sponsors and receive the advertising content directly from the sponsors. Additionally, broadcasters can receive advertising content from an advertisement broker that purchases advertisement slots and provides advertising content on behalf of sponsors.

For example, the broadcaster can enter into an agreement with an advertising broker to fill advertisement slots that the broadcaster has been unable to sell through its sales team. In these situations, the advertising broker generally requires the broadcaster to verify its content distribution authority (i.e., demonstrate that the broadcaster has the authority to control the content distributed by a broadcast feed in which the advertising content will be provided) prior to providing advertising content for inclusion in the broadcast feed. Therefore, the broadcaster is required to wait until the verification is completed before receiving advertising content to include in its broadcast feed.

SUMMARY

In general, one innovative aspect of the subject matter described in this specification can be embodied in methods that can include the following actions. For example, a request for broadcast content can be received from a requestor, where a request for broadcast content for a broadcast feed. Verification content can be specified for inclusion in the broadcast feed, where the verification content is scheduled for presentation at a specified time. In turn, the broadcast feed can be monitored for presentation of the verification content at the specified time. A determination can be made, based on the monitoring, that the verification content was presented by the broadcast feed at the specified time. In response to determining that the verification content was presented by the broadcast feed at the specified time, the requestor can be verified as an entity authorized to request services for the broadcast feed. Other embodiments of this aspect include corresponding systems, apparatus, and computer programs, configured to perform the actions of the methods, encoded on computer storage devices.

These and other embodiments can each optionally include one or more of the following features. Verification content can be specified for inclusion in the broadcast feed by providing video for transmission in the broadcast feed at the specified time. The method can further include the action of generating a reference fingerprint for the video, where the reference fingerprint is generated from video data defining the video and is an identifier of the video. Determining that the verification content was included in the broadcast feed at the specified time can include the actions of generating, at the processing apparatus, a test fingerprint based on video data provided by the monitored broadcast feed and determining that the test fingerprint matches the reference fingerprint.

Verification content can be specified for inclusion in the broadcast feed by specifying specific video content for transmission in a terrestrial, cable, or satellite broadcast during a specified advertisement slot, the verification content including data with which a test fingerprint is generated. An advertising account can be enabled for the requestor and the advertising account can be an online self-service advertisement account with which broadcast advertisements are requested by the requestor.

The method can further include the actions of receiving a schedule of advertisement slots for which advertisements are requested; identifying advertisements for presentation in the advertisement slots; and providing the advertisements for presentation in the advertisement slots according to the schedule. The method can also include the action of specifying a time at which the verification content is scheduled for presentation, the specified time being a time period in which presentation of the verification content verifies the requestor's content distribution authority over the broadcast feed.

Particular embodiments of the subject matter described in this specification can be implemented so as to realize one or more of the following advantages. Verification of content distribution authority can be automated by detecting presentation of verification content at a verification time. Delivery of broadcast advertising content to broadcasters can be automated based on the verification of content distribution authority. Self-service online advertising accounts can be activated for broadcasters based on the verification of content distribution authority.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Authority to control a content feed is verified by determining that verification content is provided in the broadcast feed at a specified time. For example, in response to a request for broadcast content, the verification content can be provided to the requestor (e.g., a broadcaster) with instructions that the verification content be provided for presentation at a specified time. In turn, the broadcast feed can be monitored to verify that the verification content is presented at the specified time, thereby verifying the requestor as a party having content distribution authority over the broadcast feed. Once the requestor's content distribution authority has been verified, the requestor can request sponsored content for inclusion in the broadcast feed.

Content distribution authority over a content feed can be verified by a verification subsystem implemented in a data processing apparatus that includes one or more processors configured to verify authority to control content distribution. In some implementations, the verification subsystem can be implemented as an element of an advertisement management system. In other implementations, the verification subsystem can be implemented in a data processing apparatus that communicates over a network or directly with the advertisement management system.

The verification subsystem is described throughout this document as being a subsystem of an advertisement management system that provides advertising content, but the verification subsystem can be implemented as a subsystem of a system that provides other broadcast content (e.g., scheduled programming content). Additionally, the verification subsystem can be implemented to verify content distribution authority for network resources, such as streamed content that is provided over a distributed network. Thus, while the examples below are illustrated primarily in the context of video broadcasts, the description is also applicable to content provided in an online environment.

Figure 1:
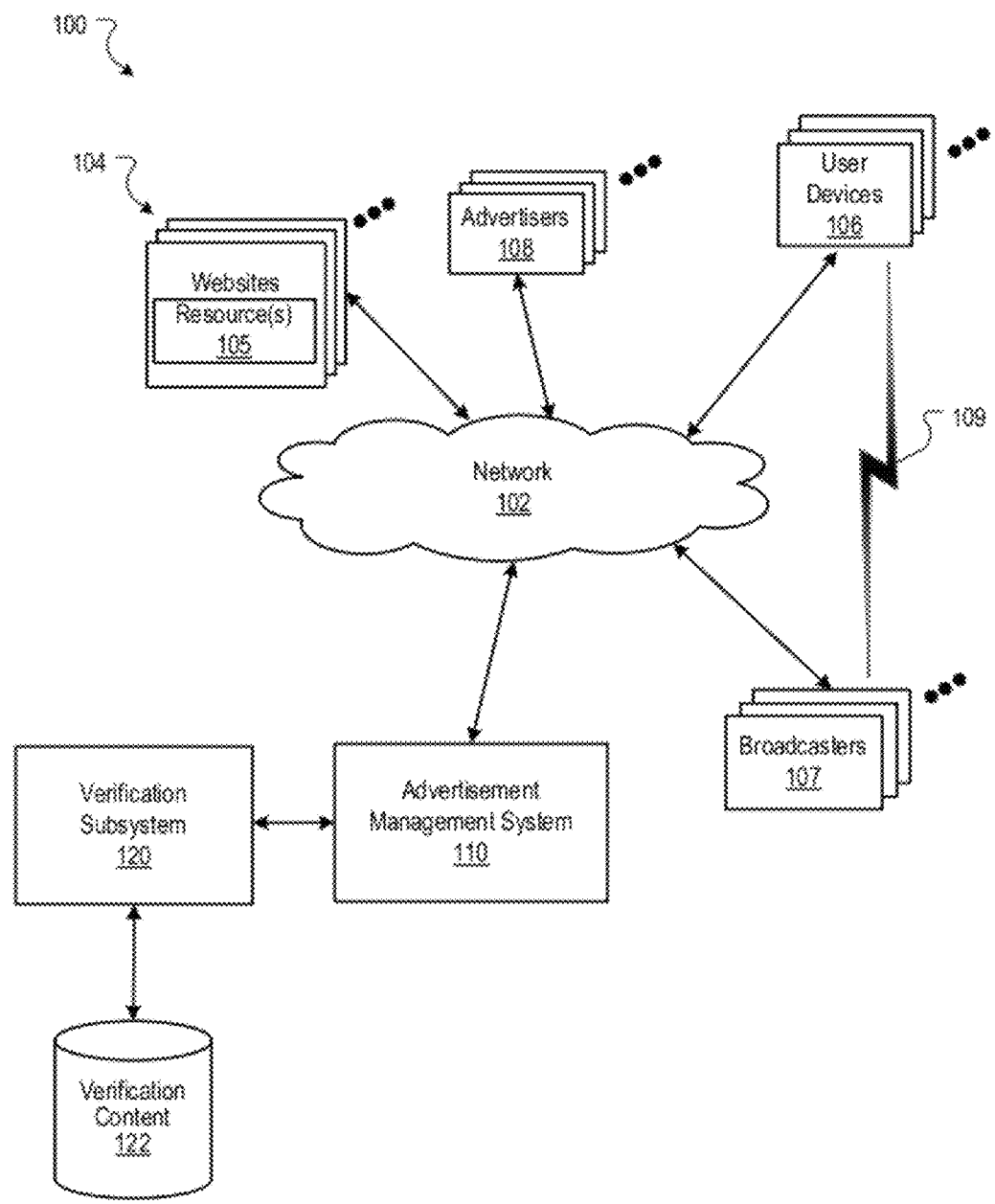
FIG. 1 is a block diagram of an example environment in which an advertising management system manages distribution of advertising content.

FIG. 1 is a block diagram of an example environment 100 in which an advertising management system 110 manages distribution of advertising content. The example environment 100 includes a network 102 such as a local area network (LAN), wide area network (WAN), the Internet, a cable television distribution network, or a combination thereof. The network 102 connects websites 104, user devices 106, broadcasters 107, advertisers 108, and the advertisement management system 110. The example environment 100 may include many thousands of websites 104, user devices 106, broadcasters 107, and advertisers 108.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website 104.

A resource 105 is any data that can be provided over the network 102 and that is associated with a resource address. Resources include HTML pages, word processing documents, portable document format (PDF) documents, images, as well as audio and video feed sources, to name only a few. The resources can include content, e.g., words, phrases, images and sounds that may include embedded information (such as meta-information in hyperlinks) and/or embedded instructions (such as JavaScript scripts).

A user device 106 is an electronic device that is under control of a user and is capable of receiving resources 105 over the network 102 and/or decoding broadcast signals 109 from a broadcaster 107. Example user devices 106 include personal computers, mobile communication devices, terrestrial broadcast receivers, cable set top boxes, satellite receivers and other devices that can send and/or receive data over the network 102. A user device 106 can include a user application, such as a web browser, to facilitate the sending and receiving of data over the network 102.

In some implementations, a user device 106 can request resources 105 from a website 104. In turn, data representing the resource 105 can be provided to the user device 106 for presentation by the user device 106. For example, audio and video files can be provided by a website hosting audio and video content. In response to a request for a particular audio or video file, data representing the requested file is provided to the user device 106. In turn, the user device 106 can generate a video and/or audio presentation on a display device using the data.

In other implementations, a user device can receive broadcast signals 109 from broadcasters 107, decode the broadcast signals, and present video and/or audio on a display device. For example, a user can tune a television or a broadcast receiver (e.g., cable television or satellite receiver) to a particular channel to view the broadcast content being transmitted over the broadcast signals corresponding to the particular channel. The broadcast signals can be satellite radio and/or television transmissions, terrestrial audio and/or video transmissions, and cable television transmissions. The broadcast signals can be transmitted over wired or wireless communications channels, including radio frequency ("RF") channels in a wired or wireless communications network.

Broadcasters 107 are content providers that provide broadcast content for presentation by user devices 106. The broadcasters 107 can include cable network operators, satellite network operators, and terrestrial broadcasters. The broadcast content is content that is provided to user devices over the broadcast signals 109 and includes programming content, advertising content, and other content (e.g., programming guide data) that is presented by the user devices 106. Programming content is broadcasting content that is designated as non-advertising content. Programming content can be identified, for example, by viewing a program listing that lists scheduled programming for broadcast channels. Advertising content is broadcasting content that is provided to promote particular products and/or services. The advertising content is identifiable based on its promotion of a particular product or service, a determination of whether the content is included in a programming guide, monetary compensation to the broadcaster for presentation of the content, as well as the sponsor of the content.

With reference to a broadcast environment, example advertising content can include broadcast content that is not listed in a programming guide, is provided on behalf of a commercial retailer or service provider, and for which the broadcaster receives compensation in exchange for presentation of the content. In contrast, example programming content can include broadcast content that is listed in a programming guide, and for which the broadcaster pays the provider of the content in exchange for the right to provide the content.

Resource publishers of websites 104 and broadcasters 107 can monetize the content that they provide by presenting advertising content. The advertising content can be provided in advertising slots. Broadcasters 107 can specify portions of a display, time slots, or other delineations of broadcast content as advertisement slots. For example, a broadcaster may specify 15, 30, and/or 60 second time slots of a broadcast feed in which advertising content can be inserted. Similarly, the broadcasters 107 can include advertising content that is presented in a banner or overlay that appears at the top and/or bottom of the programming content.

Similarly, a publisher of a website can include, in data representing a resource, data specifying a portion of the resource or a portion of a user display (e.g., a presentation location of a pop-up window) in which advertising content can be presented. Additionally, a publisher of a Website that provides access to audio, video or other streaming content can specify times during presentation of the content at which advertising content can be presented.

Resource publishers and broadcasters 107, referred to collectively as "requestors," can request advertising content to be provided with their respective resources 105 and programming content. For example, the requestor can submit the advertising content request to the advertisement management system 110. The advertising content request can include characteristics of the advertisement slots in which the advertising content will be presented.

For example, an advertising content request that is received from a broadcaster can include a time at which the advertisement will air, a duration of advertising content that can be presented in the advertisement slot, a channel on which the advertising content will be provided, a description of the programming content that will be presented before and after the advertisement slot, as well as demographic information characterizing users that are expected to receive the advertising content. The time at which the advertising content will air can be specified as a time interval within which the advertising content will be presented (e.g., between 12:45 p.m. and 1 p.m.).

A request for advertising content received from a resource publisher can include a reference (e.g., URL) to the resource for which the advertisement slot is defined, the size of the advertisement slot, demographic information characterizing users that are expected to receive the advertising content, and/or media types that are available for presentation in the advertisement slot can be provided to the advertisement management system 110. The time at which advertising content is provided within a streaming resource (e.g., audio and video content) can be specified as a time relative to the beginning of the content being streamed. For example, the time at which the content will be provided can be specified as preceding presentation of the streaming resource, a specified amount of time after presentation the streaming resource is initiated, or following presentation of the streaming resource.

In response to the advertising content request, the advertisement management system 110 can select, for presentation, advertising content having characteristics matching the characteristics of the advertisement slot. In turn, the advertisement management system 110 can provide the resource publisher or broadcaster 107 with the advertising content for presentation in the advertisement slot.

The advertising content selected in response to the request can be advertisements that have been provided to the advertisement management system 110 by advertisers 108. For example, the advertisers 108 can establish advertising accounts with the advertisement management system 110 to manage the distribution of their advertisements. In turn, the advertisers 108 can upload advertisements for distribution, specify characteristics of advertisement slots for which their advertisements are eligible for presentation, and monitor performance measures/advertising expenses for their advertisements.

In some implementations, advertising content is provided to requestors that have been identified as having content distribution authority over a resource or a broadcast feed. Therefore, the advertisement management system 110 can verify that a requestor has content distribution authority over the resource or broadcast feed prior to providing advertising content to the requestor. A requestor can demonstrate its content distribution authority over the resource or broadcast feed by making verification content (e.g., specified advertising content) available according to specified criteria. For example, a resource publisher can demonstrate its authority by making the verification content available at a specified network location, while a broadcaster can demonstrate its authority by including the verification content in a broadcast feed for presentation at a specified time. Verification content is described in more detail with reference to FIGS. 2 and 3.

To facilitate the verification process, the advertisement management system 110 can include a verification subsystem 120. The verification subsystem 120 can be implemented in a data processing apparatus including at least one processor configured to verify a requestor as having content distribution authority over a particular broadcast feed based on a determination that verification content was presented by the particular broadcast feed at a verification time specified, and provided to the requestor, by the verification subsystem.

The verification subsystem 120 can also be implemented to determine whether the requestor has made the verification content available according to the specified criteria. For example, the verification subsystem 120 can monitor a broadcast signal of a requestor to determine whether the verification content aired within a time frame specified by the verification subsystem 120, as described in more detail with reference to FIGS. 2 and 3. Upon verification that the verification content was presented according to the specified criteria, the requestor is authorized to receive content from the advertisement management system 110. For example, the advertisement management system 110 can provide content for inclusion in a broadcast feed for a verified broadcaster over the network 102.

Figure 2:
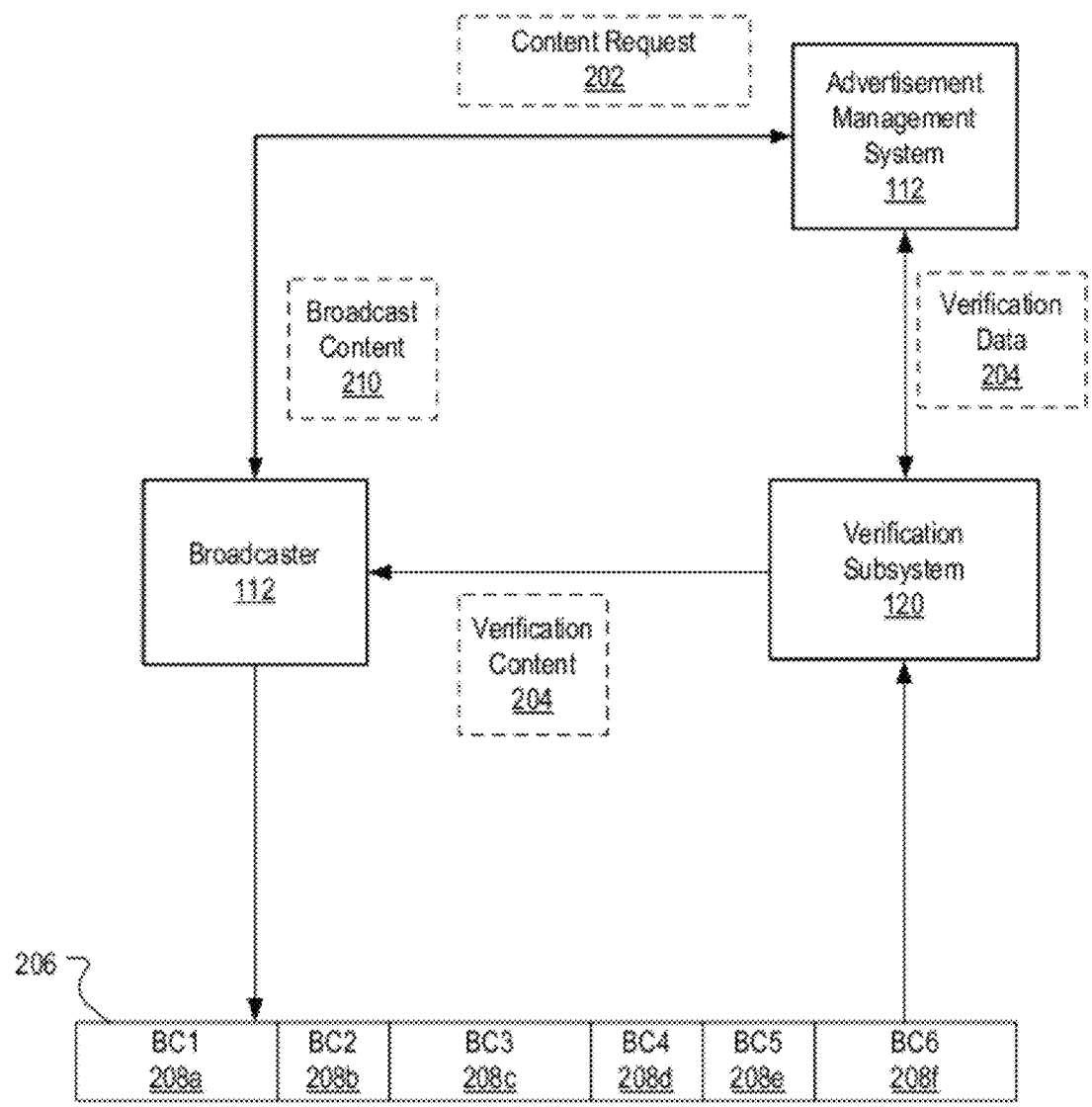
FIG. 2 is a block diagram of an example process flow for verifying a requestor's authority to control a broadcast feed.

FIG. 2 is a block diagram of an example process flow 200 for verifying a requestor's content distribution authority over a broadcast feed. The advertisement management system 110 receives a content request 202 for broadcast content (e.g., advertising content) from a requestor, such as a broadcaster 112. In response to the request, the advertisement management system 110 determines whether the broadcaster 112 has been authorized to receive broadcast content 210 from the advertisement management system 110. If the broadcaster 112 has not yet been authorized to receive broadcast content 210, the verification subsystem 120 provides the broadcaster 112 with verification content 204. The verification content 204 includes content that must be included in a broadcast feed 206 for which content is being requested. The verification content 204 can also include data specifying a time at which the content is to be presented to demonstrate control over the broadcast feed 206.

The broadcaster 112 inserts the verification content 204 into the broadcast feed 206 so that the verification content 204 will be presented at the specified time. The broadcast feed 206 can include, for example, time slots 208a-208f in which broadcast content will be presented. For example, time slots 208a, 208c, and 208f can be time slots in which programming content (e.g., television shows, sporting events, or other non-advertising content) are presented, while time slots 208b, 208d, and 208e are time slots in which advertising content is presented. In this example, the time slot 208e may be scheduled for presentation at the specified time, such that the broadcaster 112 can insert the verification content 204 in the broadcast feed at time slot 208e.

The broadcast feed 206 is monitored by the verification subsystem 120 to determine whether the content presented in the broadcast feed 206 at the specified time 208e matches the verification content 204. In some implementations, the content presented in the broadcast feed 206 at the specified time 208e is determined to match the verification content 204, for example, if the content presented at the specified time 208e has a same watermark as the verification content 204.

For example, the verification content 204 that is provided to the broadcaster can include an embedded video (and/or audio) watermark that, upon detection is an indication that the verification content 204 was provided. A video watermark is data that is added to a video (and/or audio) portion of a video broadcast that can be detected by analyzing data of the video broadcast. Similarly, the content presented at the specified time can match the verification content by having an electronic fingerprint (e.g., a hash value for the content or other fingerprint) that matches a reference fingerprint corresponding to the verification content 204. Other methods can be used to determine that the content presented at the specified time 208e matches the verification content 204, such as comparing the content to the verification content using a picture quality analysis system or other full reference video analysis system.

The verification subsystem 120 includes hardware and/or software configured to perform the monitoring and comparison described above. For example, if the verification content is identified using hash values of video frames, the verification subsystem 120 can hash frames of broadcast video during a time period in which the specified time occurs, and compare each hash to the verification content hash values. Similarly, if the verification content is identified using a video watermark, the verification subsystem 120 can monitor the data of the video broadcast and compare the monitored data to a reference watermark.

Once the verification subsystem 120 has determined that the broadcast content received at the specified time 208e matches the verification content, the verification subsystem 120 authorizes the broadcaster 112 to receive broadcast content 210 from the advertisement management system 112. In turn, the advertisement management system 120 can provide the broadcast content 210 to the broadcaster 112, for example, in response to self-service requests for advertising content submitted by the broadcaster 112.

Figure 3:
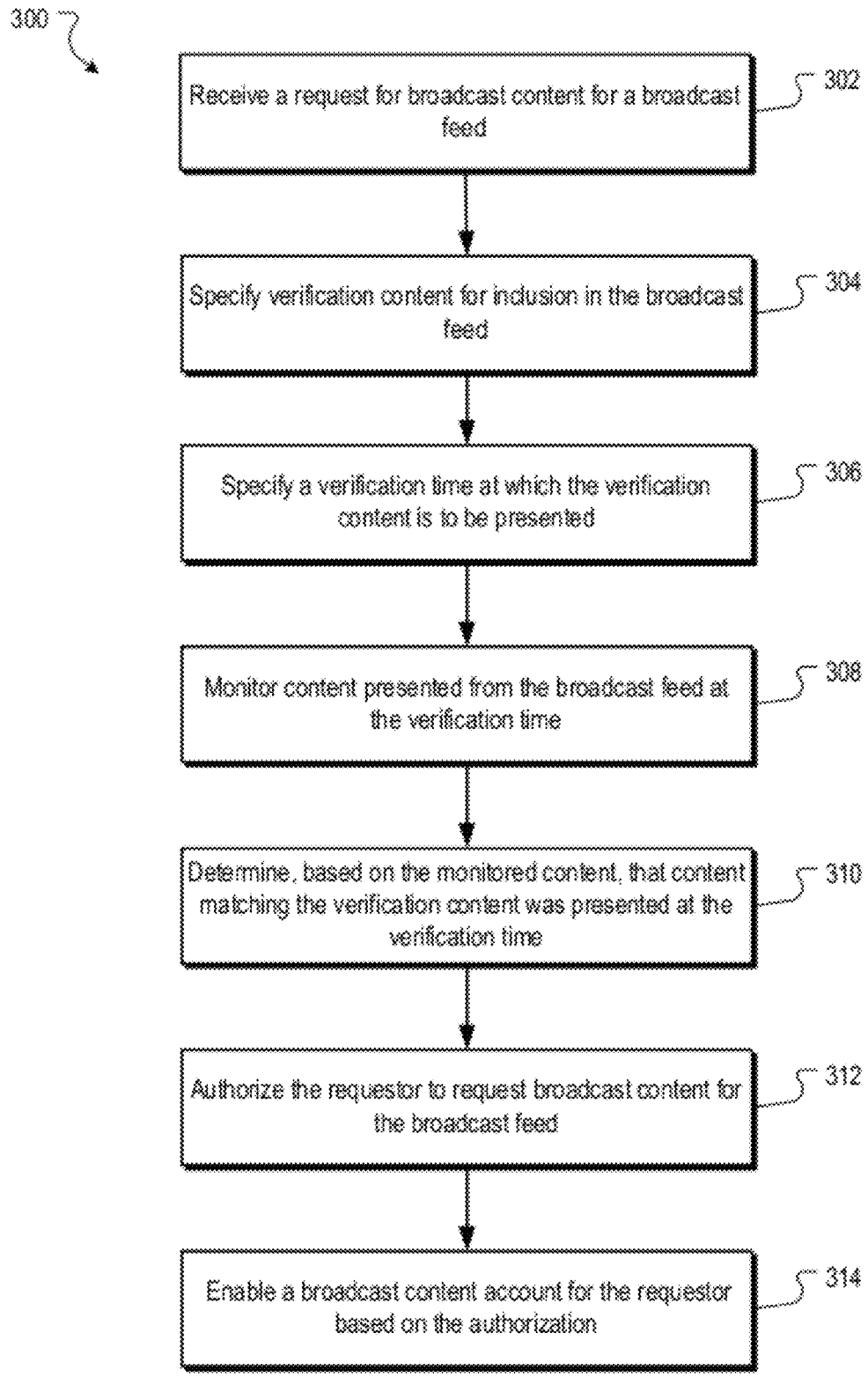
FIG. 3 is a flow chart of an example process for verifying a requestor's authority to control content of a content feed.

FIG. 3 is a flow chart of an example process 300 for verifying a requestor's content distribution authority over a content feed. The example process 300 is a process by which verification content is specified for inclusion in a content feed in response to a request for content. In turn, the broadcast feed in which the verification content is to be included is monitored and a determination is made whether the verification content was presented at the specified time. In response to determining that the verification content was presented by the broadcast feed at the specified time, the requestor is verified as having content distribution authority over the broadcast feed. Once the requestor has been verified, content can be provided to the requestor for inclusion in the content feed on demand.

The process 300 can be implemented, for example, by the advertisement management system 110 and/or verification subsystem 120 of FIG. 1. In some implementations, the advertisement management system 110 and the analysis subsystem 120 each include one or more processors that are configured to perform actions of the process 300. In other implementations, a computer readable medium can include instructions that, when executed by a computer, cause the computer to perform actions of the process 300.

The process 300 is described with reference to a broadcast feed that is provided by a broadcaster. However, the description is applicable to other forms of distributed content (e.g., audio and/or video content provided in a distributed computing environment). Additionally, the process 300 is described with reference to providing advertising content for inclusion in the broadcast feed, but other forms of content can be similarly provided.

A request for broadcast content for a broadcast feed is received (302). In some implementations, the request for broadcast content is a request for advertisements to be provided in a television broadcast. The request for broadcast content can also be a request to create a self-service advertising account. For example, a broadcaster can submit a request to establish an advertising account that enables the broadcaster to request advertisements for presentation in advertisement slots of a broadcast feed. For example, the request can result from a selection of a link or "button" on a web page provided by an advertising broker that initiates or continues an account registration process.

Verification content for inclusion in the broadcast feed is specified (304). In some implementations, the verification content is advertising content or other broadcast content that can be included in the broadcast feed. The verification content can be specified by a verification subsystem, such as the verification subsystem 120 of FIG. 1. For example, the verification subsystem 120 can specify a public service announcement or another advertisement to be included in the broadcast feed. Alternatively, the verification content can be specified by the requestor. For example, the requestor can provide the verification subsystem with an advertisement or other broadcast content that the requestor will include in the broadcast feed at an agreed upon time.

In some implementations, the verification content is required to be "unique content" that is not identifiable from a publicly published programming schedule, or for which future presentation times are discernable based, for example, on previous presentation times. For example, the verification content can be required to be a commercial that is not presented more than a threshold number of times over a specified period. Similarly, the verification content can be restricted from being content from a movie that is scheduled for presentation as identified in a programming guide, or an advertisement that is presented during a same time period on a predictable basis. Requiring the verification content to be unique content reduces the likelihood that a requestor is improperly verified as having content distribution authority over the broadcast feed because the requestor is not able to specify, as verification content, content that is regularly included or scheduled to be included in the broadcast feed.

A threshold number of times that content can be included in a broadcast feed and still be defined as unique content can be computed, for example, based on a likelihood that a requestor is able to predict a presentation time for the content based on previous presentations of that content. Statistical analysis can be performed to identify likelihoods that particular content will be presented at particular times based on the previous times at which the particular content has been presented.

For example, if there is a 30% chance of correctly selecting a presentation time for a commercial, based on an analysis of previous presentation times of the commercial, the commercial can be prevented from being used as verification content. Similarly, any content that has been publicly identified as being scheduled for presentation can be prevented from being used as verification content because the time at which the content is being presented is publicly available, such that presentation of the content at the published time does not indicate a requestor's control over the broadcast feed.

A verification time at which the verification content is to be presented is specified (306). The verification time is a specified time at which presentation of the verification content verifies a requestor as having content distribution authority over a broadcast feed. In some implementations, the verification time can be specified as a time period within which the verification content is to be presented. For example, the verification time can be specified as a one hour period (e.g., 1 pm-2 pm) or a one half hour period (e.g., 1:00 pm-1:30 pm) within which the verification content is to be presented.

The time period in which the verification content is to be presented can vary according to a type of programming content that is being presented at or near a beginning time for the verification time. The verification time can be a larger period of time when the programming being presented near a beginning time of the verification time is a sporting event (or another live event with unscheduled breaks), as compared to a verification time for a movie, because the times at which advertisements are presented during sporting events varies according to breaks in the sporting event. For example, advertisements are often presented during time-outs of a football or basketball game and at the end of baseball innings. However, the times at which these events occur can vary substantially throughout the game and therefore, the time at which an advertisement scheduled in the tenth advertisement slot during a sporting event can vary significantly. In contrast, the times at which advertisements are presented during a movie are more predictable (i.e., scheduled breaks) because the events of the movie are known prior to broadcast.

The verification time can be selected, for example, from times at which advertisement slots in the broadcast feed are available. For example, the broadcaster can provide a list of time slots that are available in the broadcast feed. In turn, the verification subsystem can select as the verification time, one or more of the available time slots in which the verification content is to be inserted into the broadcast feed.

Content presented by the broadcast feed at the verification time is monitored (308). In some implementations, the content can be monitored by a human viewer that views a presentation device with which the content is presented. For example, the human viewer can monitor a channel over which the broadcast feed is transmitted by tuning a cable/satellite receiver to the channel and viewing the content that is presented by a connected display device.

In other implementations, the content can be monitored by an electronic monitoring system that tunes a receiver to the channel over which the verification content is to be provided. For example, the verification subsystem can run a programming script that causes a tuner to tune to the channel over which the verification content is to be presented at the verification time or at a time prior to the verification time and monitor the content until the end of the verification time or a time following the end of the verification time. The electronic monitoring system can record the content, for example, to a content recorder for later analysis or initiate real-time analysis on the received broadcast feed.

A determination is made, based on the monitored content, that content matching the verification content was presented at the verification time (310). In some implementations, the determination that the presented content matches the verification content by comparing the monitored content to the verification content. For example, the verification content can be loaded into a video analysis system as reference content. In turn, the monitored content can be input to the video analysis system, which compares the monitored content to the reference content and generates a match score representing a measure of similarity between the monitored content and the reference content. For example, an exact match can be represented by a score of 1.0, with decreasing scores of match being represented by lower numbers to a lower limit of 0.0. The measure of similarity can be based, for example, on edge analysis, color analysis, and other video similarity analysis measured on a frame by frame basis.

A match between the monitored content and the verification content can also be determined to exist when a unique identifier for the monitored content matches a unique identifier for the verification content. The unique identifier is data that uniquely identifies differing content. For example, unique identifiers can include watermarks that are embedded into video content and content "fingerprints" that are computed based on the data that define the content. The unique identifiers below are described with reference to video data, but unique identifiers can also be generated or computed based on audio or other data.

Watermarks are data that are embedded into the content, and can be identified by a watermark detection system. When watermarks are used as the unique identifiers, the determination that the monitored content matches the verification content can be made in response to detection of a watermark, in the monitored content, that matches the watermark embedded with the verification content.

Content fingerprints are data computed from attribute values of the content. A video fingerprint can be computed based on attribute values for the video content. For example, attribute values for attributes of the video, such as color, texture, edge analysis, scale-invariant feature transform, motion tracking, and other attribute value detection techniques can be used to determine attribute values for the video and compute a fingerprint that uniquely identifies the video content. Audio fingerprints can also be computed using attribute values of the audio. When audio and video fingerprints are both computed for content, the audio and video fingerprints can both be used to generate a content fingerprint.

When content fingerprints are used as the unique identifiers, the content fingerprints for the verification content can be stored as reference fingerprints to which the fingerprints of the monitored content will be compared. When the monitored content is received (or analyzed following recording) test fingerprints can be computed for the monitored content and compared to the reference fingerprints. When a match is detected between the test fingerprints and the reference fingerprints, then a determination can be made that the monitored content matches the verification content.

The requestor is authorized to request broadcast content for the broadcast feed (312). In some implementations, the requestor is authorized in response to the determination that the monitored content matched the verification content. Determining that the monitored content matched the verification content is a reliable indication that the requestor has content distribution authority over the broadcast feed.

Additionally, the determination indicates that any content distribution configuration settings provided by the requestor are properly configured, thereby facilitating subsequent automated delivery of content for insertion in the broadcast feed. For example, if the verification content is provided for insertion in the broadcast feed using the configuration settings provided by the requestor, then presentation of content matching the verification content at the verification time is a reliable indication that content subsequently provided for inclusion in the broadcast feed will also be presented. Thus, automated delivery of content for the broadcast feed can continue without manual configuration.

A broadcast content account is enabled for the requestor based on the authorization (314). In some implementations, enabling the broadcast account enables the requestor to request content for inclusion in the broadcast feed through a self-service content request interface. For example, the broadcast content account can be a self-service advertisement account with which a broadcaster can access a self-service user interface to request advertisements to include in available advertisement slots.

Figure 4:
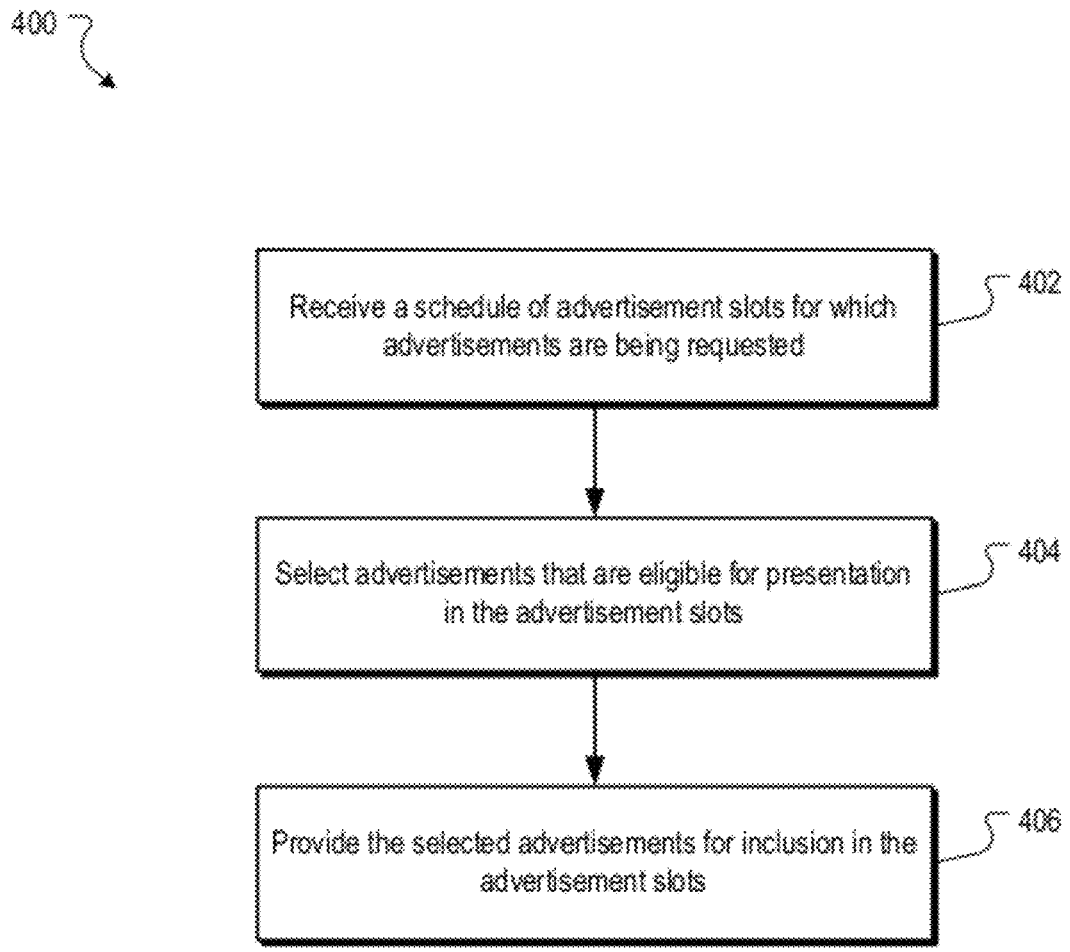
FIG. 4 is a flow chart of an example process for providing content for a broadcast feed.

FIG. 4 is a flow chart of an example process 400 for providing content for a broadcast feed. The process 400 is a process by which a schedule of content slots for which content is being requested are received from a requestor (e.g., a broadcaster) that has been authorized to receive content for a specified broadcast feed. In response to the request, content that is eligible for inclusion in the broadcast feed is identified and provided for inclusion in the broadcast feed.

The process 400 can be implemented, for example, by the advertisement management system 110 of FIG. 1. In some implementations, the advertisement management system 110 includes one or more processors that are configured to perform actions of the process 400. In other implementations, a computer readable medium can include instructions that, when executed by a computer, cause the computer to perform actions of the process 400.

The process 400 is described with reference to a broadcast feed that is provided by a broadcaster. However, the description is applicable to other forms of distributed content (e.g., audio and/or video content provided in a distributed computing environment). Additionally, the process 400 is described with reference to providing advertising content for inclusion in the broadcast feed, but other forms of content can be similarly provided.

A schedule of advertisement slots for which advertisements are being requested is received (402). In some implementations, the schedule of advertisement slots is received from a requestor that has been authorized to request content for a specified broadcast feed. The schedule of advertisement slots can be, for example, a list of unallocated advertisement slots remaining for a specified broadcast feed over a specified time period. For example, the advertisement slots may be the advertisement slots that remain for the broadcast feed over an upcoming week of broadcast programming.

The schedule of advertisements can specify a time at which each of the advertisements will be scheduled for presentation, programming content that is scheduled for presentation adjacent to the advertisements, and/or demographic information characterizing the users that are expected to be exposed to the advertisement. The schedule of advertisement slots can be received for example through a user interface provided by the advertisement management system 110 of FIG. 1. The schedule of advertisement slots can also be received in data files that are received from a advertisement slot data store that stores a schedule of available advertisement slots.

Advertisements that are eligible for presentation in the advertisement slots are selected (404). In some implementations, the advertisements that are eligible for presentation in the advertisement slots are advertisements having targeting criteria that are matched by information provided with the request for advertisements. For example, an advertisement having targeting criteria specifying that the advertisement is eligible for presentation in advertisement slots that air between 5 p.m. and 8 p.m. on broadcast channels 2, 5, and 11, can be selected in response to a request for advertisements for presentation in advertisement slots that will air between 6 p.m. and 7 p.m. on broadcast channel 5. Similarly, an advertisement having targeting criteria specifying that an advertisement is eligible for presentation in advertisement slots that will be exposed to an audience that includes 1,000,000 users that are 21-35 years old can be selected in response to a request for advertisements for advertisement slots that includes data specifying that the advertisements will be presented to 1,500,000 different 21-35 year old users.

The selected advertisements are provided for inclusion in the advertisement slots (406). In some implementations, the advertisements can be provided in a file that can be manually inserted in a time slot of the broadcast feed that corresponds to the advertisement slot. In other implementations, the advertisements can be automatically inserted in the broadcast feed using configuration settings provided by the requestor that is authorized to request content for the broadcast feed.

Figure 5:
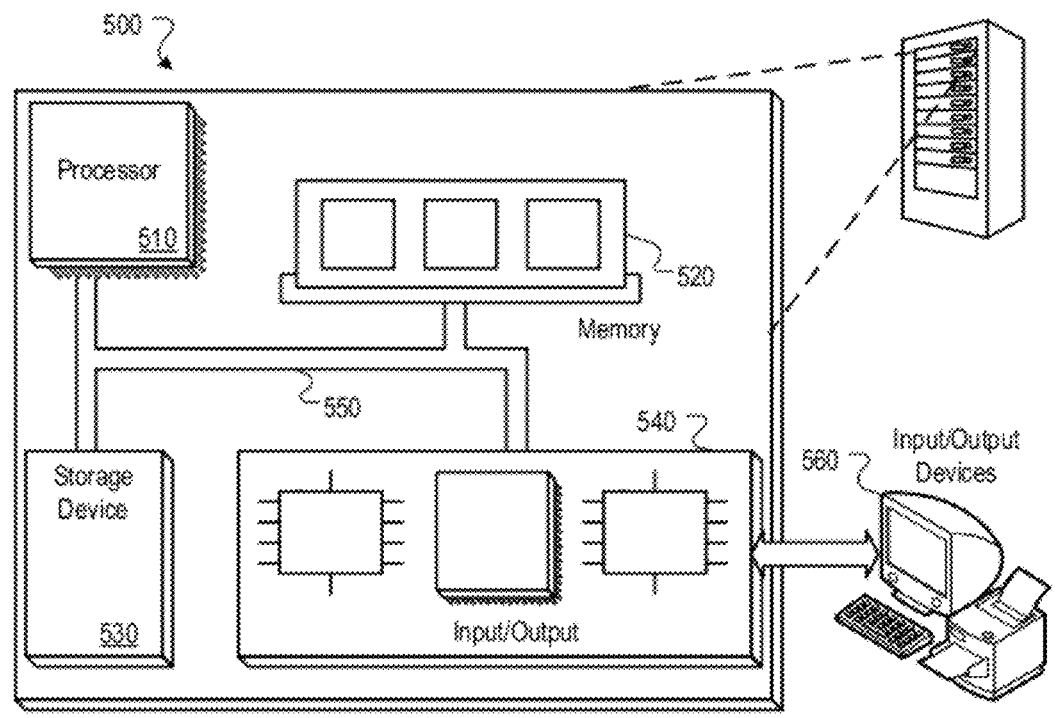
FIG. 5 is a block diagram of an example computer system that can be used to verify a requestors authority to control content distribution.

FIG. 5 is a block diagram of an example computer system 500 that can be used to verify a requestor's content distribution authority. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The verification subsystem 120 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The verification subsystem 120 and/or advertisement management system 110 can be implemented in a distributed manner over a network, such as a server farm, or can be implemented in a single computer device.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, by a processing apparatus and from a requestor, a request for broadcast content for a broadcast feed;
   specifying, by the processing apparatus, verification content for inclusion in the broadcast feed, the verification content being scheduled for presentation at a specified time;
   monitoring, by the processing apparatus, the broadcast feed for presentation of the verification content at the specified time;
   determining, from the monitoring and by the processing apparatus, that the verification content was presented by the broadcast feed at the specified time;
   in response to determining that the verification content was presented by the broadcast feed at the specified time, verifying, by the processing apparatus, the requestor as an entity authorized to request services for the broadcast feed; and
   in response to verifying the requestor of the broadcast content, enabling, for the requestor, an online self-service advertisement account with which broadcast advertisements are requested.

2. The method of claim 1, wherein specifying verification content for inclusion in the broadcast comprises providing video having a corresponding unique identifier for transmission in the broadcast at the specified time, and wherein determining that the verification content was presented comprises detecting the corresponding unique identifier.

3. The method of claim 2, further comprising generating a reference fingerprint for the video, the reference fingerprint being generated from video data defining the video, the reference fingerprint being the corresponding unique identifier for the video.

4. The method of claim 3, wherein determining that the verification content was provided by the broadcast feed at the specified time comprises:
   generating, at the processing apparatus, a test fingerprint based on video data provided by the monitored broadcast feed; and
   determining that the test fingerprint matches the reference fingerprint.

5. The method of claim 1, wherein specifying verification content for inclusion in the broadcast comprises specifying specific video and audio content for transmission in a terrestrial, cable, or satellite broadcast during a specified advertisement slot, the verification content including data with which a test fingerprint is generated.

6. The method of claim 1, further comprising:
   receiving a schedule of advertisement slots for which advertisements are requested; identifying advertisements for presentation in the advertisement slots; and
   providing the advertisements for presentation in the advertisement slots according to the schedule.

7. The method of claim 1, further comprising specifying, by the processing apparatus, a time at which the verification content is scheduled for presentation, the specified time being a time period in which presentation of the verification content verifies requestor control of the broadcast feed.

8. The method of claim 7, wherein determining that the verification content was presented by the broadcast feed at the specified time comprises determining that the verification content was presented in an advertisement slot during a specified broadcast program.

9. A system, comprising:
   an advertisement management system including at least one processor configured to provide advertising content for a broadcast feed in response to a request for the advertising content from a requestor that is authorized to control content included in the broadcast feed; and
   a verification subsystem coupled to the advertisement management system, the verification subsystem including at least one processor configured to verify a requestor as being authorized to control content included in a particular broadcast feed based on a determination that verification content, provided to the requestor by the verification subsystem, was presented by the particular broadcast feed at a verification time specified, wherein the verification subsystem is further configured to enable an online self-service advertisement account that facilitates automated insertion of advertisements into the particular broadcast feed.

10. The system of claim 9, wherein the verification subsystem is further configured to provide the verification content to the requestor in response to a request from the requestor for broadcast content.

11. The system of claim 10, wherein the verification content specifies the verification time at which the verification content is to be presented by the broadcast feed.

12. The system of claim 9, wherein the verification subsystem is further configured to monitor the particular broadcast feed to determine whether the verification content is presented at the verification time.

13. The system of claim 12, wherein the verification subsystem is further configured to determine that the verification content was presented at the verification time by monitoring content presented by the particular broadcast feed at the verification time and detecting a unique identifier corresponding to the verification content.

14. The system of claim 13, wherein the unique identifier is a watermark that was inserted in the verification content.

15. The system of claim 13, wherein the unique identifier is a fingerprint for the verification content, the fingerprint being computed based on the verification content.

16. The system of claim 13, wherein the verification subsystem is further configured to determine that the verification content was presented at the verification time by determining that a test identifier detected from video data provided by the monitored content matches a reference identifier for the verification content.

17. A computer storage medium encoded with a computer program, the program comprising instructions that when executed by data processing apparatus cause the data processing apparatus to perform operations comprising:

receiving, from a requestor, a request for broadcast content for a broadcast feed;

specifying verification content for inclusion in the broadcast feed, the verification content being scheduled for presentation at a specified time;

monitoring the broadcast feed for presentation of the verification content at the specified time;

determining, from the monitoring, that the verification content was presented by the broadcast feed at the specified time;

in response to determining that the verification content was presented by the broadcast feed at the specified time, verifying the requestor as an entity authorized to request services for the broadcast feed; and in response to verifying the requestor of the broadcast content, enabling, for the requestor, an online self-service advertisement account with which broadcast advertisements are requested.

* * * * *